(12) United States Patent
Wright

(10) Patent No.: US 11,592,457 B2
(45) Date of Patent: Feb. 28, 2023

(54) METHODS AND SYSTEMS FOR TUNNEL PROFILING

(71) Applicant: ArcByt, Inc., San Francisco, CA (US)

(72) Inventor: Ian Wright, Woodside, CA (US)

(73) Assignee: ArcByt, Inc., San Francisco, CA (US)

( * ) Notice: Subject to any disclaimer, the term of this patent is extended or adjusted under 35 U.S.C. 154(b) by 0 days.

(21) Appl. No.: 17/651,566

(22) Filed: Feb. 17, 2022

(65) Prior Publication Data

US 2022/0260607 A1  Aug. 18, 2022

Related U.S. Application Data

(60) Provisional application No. 63/151,039, filed on Feb. 18, 2021.

(51) Int. Cl.
*G01P 13/00* (2006.01)
*E21B 47/00* (2012.01)
(Continued)

(52) U.S. Cl.
CPC ............... *G01P 13/00* (2013.01); *E21B 7/00* (2013.01); *E21B 47/00* (2013.01); *E21D 9/093* (2016.01);
(Continued)

(58) Field of Classification Search
CPC .......... G01P 15/08; G01P 15/18; G01P 13/00; G01C 19/00; E21B 47/00; E21B 47/12;
(Continued)

(56) References Cited

U.S. PATENT DOCUMENTS 4,023,861 A * 5/1977 Schnell ................... E21D 9/108
299/1.8
4,884,847 A * 12/1989 Bessinger ............... E21C 35/24
299/30
(Continued)

FOREIGN PATENT DOCUMENTS

GB 2039568 B 11/1982
RU 2338064 C1 11/2008

OTHER PUBLICATIONS

International Application Serial No. PCT/US2022/070713, Search Report and Written Opinion dated May 26, 2022, 7 pgs.

*Primary Examiner* — Helen C Kwok
(74) *Attorney, Agent, or Firm* — Polygon IP, LLP

(57) ABSTRACT

Described herein are new methods and systems for profiling tunnels. A method comprises moving a shuttle within a shuttle track extending between a boring apparatus (inside a tunnel) and a base station (outside the tunnel). The shuttle is equipped with a movement sensor, which records various movement parameters (e.g., linear and/or angular accelerations) while the shuttle moves within the shuttle track. These movement parameters are then transferred to a tunnel profiler (e.g., a base station) and the profile of the tunnel is determined based on these movement parameters. For example, a shuttle track can be a flexible tube (e.g., continuous or segmented) with the shuttle positioned within the tube. The shuttle can be removed from the tube or remain in the tube while the movement parameters are transferred and, in some examples, while the shuttle is recharged.

20 Claims, 6 Drawing Sheets

(51) Int. Cl.
  *E21B 7/00* (2006.01)
  *E21D 9/093* (2006.01)
  *G01P 15/18* (2013.01)
  *E21F 17/00* (2006.01)
  *G01P 15/08* (2006.01)
  *G01C 19/00* (2013.01)

(52) U.S. Cl.
  CPC .............. *E21F 17/00* (2013.01); *G01C 19/00* (2013.01); *G01P 15/08* (2013.01); *G01P 15/18* (2013.01)

(58) Field of Classification Search
  CPC ...... E21B 47/002; E21B 47/10; E21B 47/003; E21B 7/14; E21B 7/15; E21B 7/00; E21D 9/003; E21D 9/14; E21D 9/108; E21D 9/093
  See application file for complete search history.

(56) References Cited

U.S. PATENT DOCUMENTS

| | | | | |
|---|---|---|---|---|
| 4,987,684 A * | 1/1991 | Andreas | ................ | G01C 21/16 33/304 |
| 5,904,210 A * | 5/1999 | Stump | ................ | E21B 47/13 175/45 |
| 6,062,650 A * | 5/2000 | Smith | ................ | E21C 35/24 299/1.4 |
| 6,092,610 A * | 7/2000 | Kosmala | ................ | E21B 4/20 175/73 |
| 6,158,529 A | 12/2000 | Dorel | | |
| 6,467,557 B1 * | 10/2002 | Krueger | ................ | E21B 4/18 175/45 |
| 9,371,696 B2 * | 6/2016 | Oppelaar | ................ | E21B 7/067 |
| 9,657,561 B1 * | 5/2017 | Bargach | ................ | E21B 47/022 |
| 2002/0179336 A1 * | 12/2002 | Schaaf | ................ | E21B 7/062 175/325.5 |
| 2004/0112640 A1 * | 6/2004 | Hay | ................ | E21B 7/062 175/26 |
| 2012/0152013 A1 * | 6/2012 | Wilson | ................ | E21B 47/0224 73/152.54 |
| 2013/0075091 A1 * | 3/2013 | Hallundbæk | ................ | E21B 47/10 166/250.15 |
| 2014/0278111 A1 * | 9/2014 | Gerrie | ................ | E21B 47/002 702/8 |
| 2016/0053540 A9 | 2/2016 | Chitwood et al. | | |
| 2016/0356099 A1 * | 12/2016 | Kirkhope | ................ | E21B 4/16 |
| 2017/0218757 A1 * | 8/2017 | Li | ................ | G01V 1/30 |
| 2017/0234081 A1 * | 8/2017 | Kirkhope | ................ | E21B 17/021 166/378 |
| 2017/0235007 A1 * | 8/2017 | Holtz | ................ | G01V 1/46 175/24 |
| 2018/0106147 A1 * | 4/2018 | Lakings | ................ | G01V 1/44 |
| 2020/0072037 A1 * | 3/2020 | Wallis | ................ | G01C 21/16 |
| 2020/0392803 A1 * | 12/2020 | Zhao | ................ | E21B 47/00 |
| 2021/0148229 A1 * | 5/2021 | Russell | ................ | E21B 7/007 |

* cited by examiner

METHODS AND SYSTEMS FOR TUNNEL PROFILING

CROSS-REFERENCE TO RELATED APPLICATIONS

This application claims the benefit under 35 U.S.C. § 119(e) of U.S. Provisional Patent Application No. 63/151,039, filed on 2021 Feb. 18, which is incorporated herein by reference in its entirety for all purposes.

BACKGROUND

Determining the location of a boring apparatus (e.g., while boring a tunnel) and profiling the tunnel can be very important in many tunnel-boring applications. For example, tunnels can be bored in urban settings surrounded by other facilities (e.g., pipelines) that should not be impacted by boring operations. While above-ground positioning techniques (e.g., global positioning system, triangulation) have been rapidly developing, these techniques are generally not suitable for below-ground applications due to weak signal penetration through the ground. Furthermore, many tunnels are small and not accessible to humans thereby limiting options for operating in such tunnels. At the same time, ground-penetrating radars and acoustics methods are only suitable to limited depths and are not sufficiently accurate for many applications. Laser and optical systems are limited to straight and/or short tunnels. Tunnel curvatures interfere with the line of sight and require optical repeaters.

What is needed are new methods and systems for profiling tunnels, in particular, when these tunnels are being bored with boring apparatuses.

SUMMARY

Described herein are new methods and systems for profiling tunnels. A method comprises moving a shuttle within a shuttle track extending between a boring apparatus (inside a tunnel) and a base station (outside the tunnel). The shuttle is equipped with a movement sensor, which records various movement parameters (e.g., linear and/or angular displacement values) while the shuttle moves within the shuttle track. These movement parameters are then transferred to a tunnel profiler (e.g., a base station) and the tunnel profile is determined based on these movement parameters. For example, a shuttle track can be a flexible tube (e.g., continuous or segmented) with the shuttle positioned within the tube. The shuttle can be removed from the tube or remain in the tube while the movement parameters are transferred and, in some examples, while the shuttle is recharged.

In some examples, a method of profiling a tunnel comprises moving a shuttle, comprising a movement sensor, within a shuttle track extending between the boring apparatus and the base station while the movement sensor records the movement parameters of the shuttle; transferring the movement parameters from the shuttle to a tunnel profiler; and determining, at the tunnel profiler, a profile of the tunnel based on the movement parameters.

In some examples, the tunnel profiler is a part of the base station. Transferring the movement parameters from the shuttle to the tunnel profiler may be performed wirelessly through the shuttle track, extending through the base station. In some examples, transferring the movement parameters from the shuttle to the tunnel profiler is performed while recharging the shuttle.

In some examples, the shuttle comprises a drive wheel, moving and controlling the speed of the shuttle within the shuttle track. In the same or other examples, the shuttle comprises an encoder wheel determining the position of the shuttle along the shuttle track. The movement parameters are correlated to corresponding ones of the position of the shuttle within the shuttle track.

In some examples, the shuttle comprises a shuttle body and multiple support wheels. The shuttle body encloses the movement sensor. The multiple support wheels are connected to and extend outside the shuttle body, uniformly surrounding the shuttle body, and contacting the shuttle track thereby supporting the shuttle relative to the shuttle track. In some examples, the multiple support wheels are movably connected to the shuttle body allowing to change a gap between the shuttle body and the shuttle track.

In some examples, the shuttle track comprises a flexible continuous tube. Alternatively, the shuttle track comprises multiple segments joined together. The shuttle track can comprise a circular interior cross-section.

In some examples, the shuttle track comprises an interior wall and a supporting structure, protruding internally away from the interior wall. The shuttle is slidably supported by the supporting structure.

In some examples, the movement parameters comprise linear acceleration values for each of one or more internal axes of the movement sensor. In the same or other examples, the movement parameters comprise angular displacement values for each of one or more internal axes of the movement sensor.

In some examples, moving the shuttle comprises controlling the linear speed of the shuttle within the shuttle track. For example, the linear speed of the shuttle can change while the shuttle moves within the shuttle track.

In some examples, the method further comprises moving the shuttle within the shuttle track extending between the boring apparatus and the base station one or more additional times while the movement sensor records one or more additional sets of movement parameters, wherein the profile of the tunnel is further determined using the one or more additional sets of movement parameters. In more specific examples, the method further comprises resetting the movement sensor after transferring the movement parameters and before moving the shuttle within the shuttle track each one of the one or more additional times.

In some examples, determining the profile of the tunnel further comprises determining the global position of the tunnel based on the orientation of the tunnel relative to the base station and further based on the global position of the base station.

In some examples, the method further comprises steering the boring apparatus within the tunnel based on the profile of the tunnel determined at one or more different times.

Also provided is a boring system comprising a boring apparatus configured to bore a tunnel, a base station configured to supply power and operating instructions to the boring apparatus while boring apparatus bores the tunnel, a shuttle track configured to extend between the boring apparatus and the base station while boring apparatus bores the tunnel, a shuttle comprising a movement sensor and configured to move within the shuttle track between the boring apparatus and the base station while the movement sensor records movement parameters of the shuttle, and a tunnel profiler configured to receive the movement parameters from the shuttle and determine a profile of the tunnel based on the movement parameters.

DETAILED DESCRIPTION

Figure 1A:
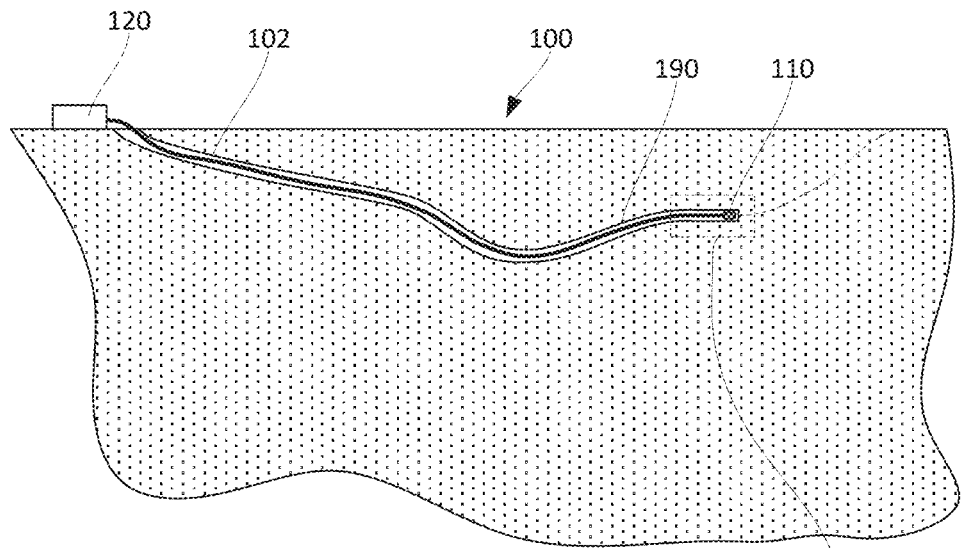
FIG. 1A is a cross-sectional schematic view of a tunnel being bored by a boring apparatus while connected to a base station, positioned outside the tunnel, in accordance with some examples.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

Boring a tunnel, especially a small-diameter long tunnel, to follow a specific tunnel path can be very difficult yet very important for many tunnel applications. For example, a tunnel path can extend close to various preexisting structures (e.g., other tunnels, pipelines). Furthermore, a tunnel often needs to exit at a very specific location. Some difficulties with following the tunnel path come from the operating environment, e.g., materials forming a boring face, shock, and vibration of the boring apparatus. Additional challenges are associated with tunnel profiling and determining whether the tunnel follows the desired tunnel path, which may be collectively referred to as tunnel profiling. While a boring apparatus can be steered inside the tunnel to follow the desired path, the steering input needs to be based on the current location, orientation, and other positioning factors associated with the boring apparatus as well as the actual profile of the tunnel.

As noted above, many conventional above-the-ground positing techniques are not suitable for below-the-ground applications since the tunnel environment tends to block any above-the-ground signals, especially in deep tunnels. Ground-penetrating radars and acoustics methods are only suitable to limited depths and limited environments. Furthermore, these techniques are not sufficiently accurate for many applications. Laser and optical systems are limited to straight, short, and/or larger tunnels. Tunnel curvatures interfere with the line of sight and require optical repeaters. Furthermore, the tunnel portion behind a boring apparatus can have various equipment and materials (e.g., power lines, spoil removal devices, and the like) that can interfere with optical measurements, especially in small crowded tunnels.

Positioning a movement sensor on a boring apparatus does not produce sufficient accuracy due to the low speed of the boring apparatus. For example, a boring apparatus typically moves with speeds between 0.1"/minute and 2"/minute resulting in very minimal acceleration forces when the boring apparatus turns. Furthermore, the boring apparatus experiences various shocks and vibrations during its operation resulting in a high noise background.

Described herein are new methods and systems for profiling tunnels. Specifically, a method utilizes a movement sensor positioned on a shuttle, which moves (shuttles) between a boring apparatus (inside a tunnel) and a base station (outside the tunnel). The shuttle speeds are a lot higher than that of a boring apparatus (e.g., at least 100 times or even 10,000 times higher) thereby improving the signal-to-noise ratio greatly. Furthermore, the speed of the shuttle can be specifically controlled and the shuttle can perform the same measurement multiple times (e.g., to aggregate multiple measurements). In some examples, different runs of the shuttle can be performed at different speeds. Furthermore, the speed of the shuttle can vary within the same run (e.g., a shuttle can go faster on straighter portions of the path).

A shuttle can travel on or, more specifically, within a shuttle track. The shuttle track provides an unobstructed path within the tunnel, specifically designated for the shuttle. For example, a shuttle track can be a flexible tube (e.g., continuous or segmented) with the shuttle positioned within the tube. A continuous tube can extend past the base station and feed into the tunnel as the boring apparatus continues to extend the tunnel. The shuttle can be configured to stop with the tube at the base station and wirelessly transmit movement parameters accumulated by the shuttle's movement sensor. Alternatively, the shuttle can be removed from a shuttle track (e.g., formed by a segmented tube) and directly connected to a base station.

The base station can be equipped with a tunnel profiler, which receives the movement parameters from the shuttle's movement sensor and determined the tunnel profile based on these movement parameters ad, e.g., to compare this profile to the desired profile. In some examples, the tunnel profiler is provided at the boring apparatus and/or at the shuttle. Various types of movement parameters are within the scope, e.g., linear acceleration values along one or more axes, rotation values, angular displacement values, and the like. These movement parameters can be correlated to linear positions along the shuttle track, which can be obtained using the shuttle's encoder wheel.

Boring Systems Examples

FIG. 1A is a schematic illustration of boring system 100 used for boring tunnel 190, in accordance with some examples. For example, boring system 100 can be configured to operate inside tunnel 190, which is too small for humans, e.g., less than 150 centimeters in diameter or even less than 100 centimeters in diameter. As noted above, the tunnel profiling of such small tunnels is particularly difficult. Boring system 100 can be also referred to as a boring rig, boring head, and the like.

Boring system 100 comprises boring apparatus 110 configured to bore tunnel 190, e.g., by removing materials from the tunnel's bore face. Boring system 100 also comprises base station 120 configured to supply the power and operating instructions to boring apparatus 110 while boring apparatus 110 bores tunnel 190. Base station 120 is positioned outside tunnel 190. Base station 120 is connected to boring apparatus 110 using connection portion 102, which includes various power lines, control lines, and the like. Connection portion 102 can be also used for removing spoils from tunnel 190.

Figure 1B:
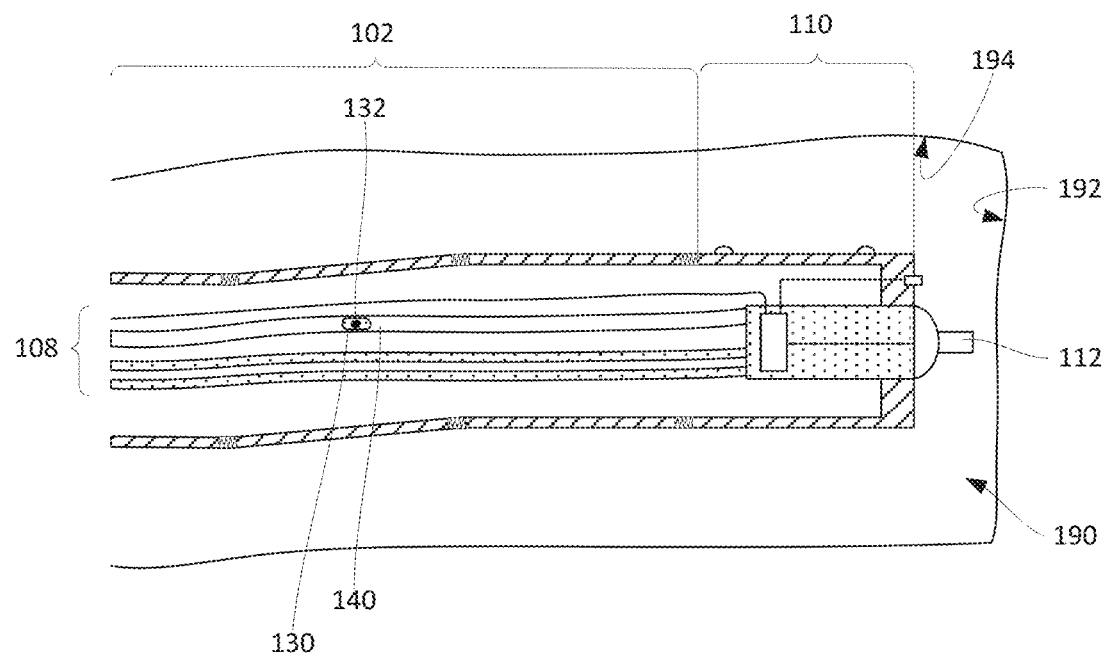
FIG. 1B is a schematic expanded view of a boring apparatus and a connection portion, positioned inside a tunnel, in accordance with some examples.

FIG. 1B is a schematic expanded view of boring apparatus 110 and connection portion 102 from FIG. 1A. In some examples, boring apparatus 110 comprises boring element 112, directed at boring face 192 of tunnel 190 to remove material from boring face 192 (e.g., generating spoils that are later removed from tunnel 190). Various examples of boring element 112 are within the scope. This material removal from boring face 192 extends tunnel 190 and forms tunnel walls 194. Boring apparatus 110 can be advanced within tunnel 190 using various means, such as a pipe jack and like.

Connecting lines 108 or, more generally, connection portion 102 comprises shuttle track 140 configured to extend between boring apparatus 110 and base station 120 while boring apparatus 110 bores tunnel 190. Furthermore, boring system 100 comprises shuttle 130 configured to move within shuttle track 140 between boring apparatus 110 and base station 120. Shuttle 130 comprises movement sensor 132, which is configured to records movement parameters 180 of shuttle 130 while shuttle 130 move within shuttle track 140. For example, movement sensor 132 can include one or more accelerometers, gyroscopes, and/or other like sensors. One example of movement sensor 132 is an inertial measurement unit (IMU). In more specific examples, movement sensor 132 comprises a 3-axis accelerometer and/or a 3-axis gyroscope. Some additional aspects of shuttle 130 and shuttle track 140 are described below with reference to FIGS. 2B and 2C.

Figure 2A:
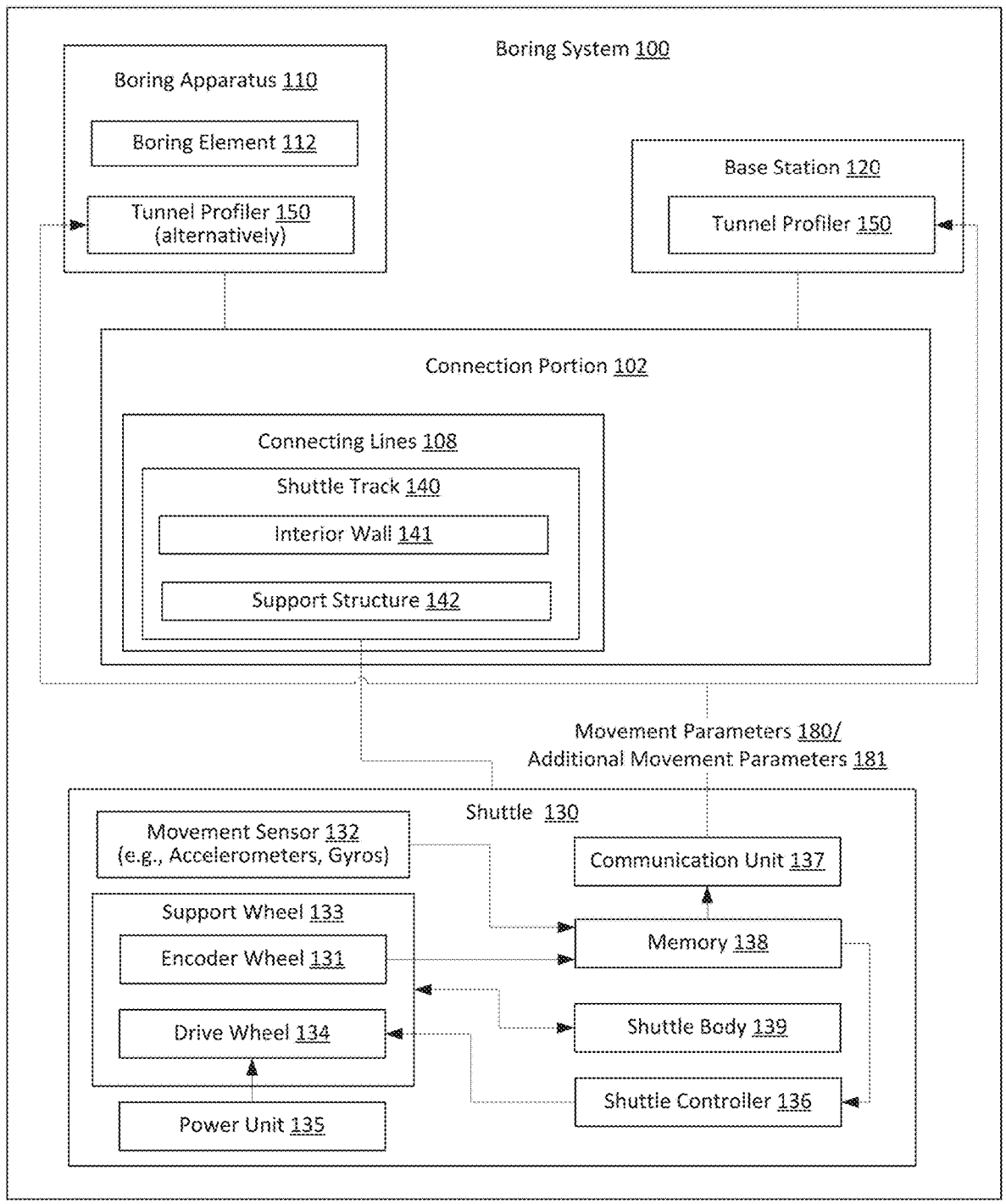
FIG. 2A is a block diagram of a boring system comprising a boring apparatus, a base station, a shuttle track extending between the boring apparatus and the base station, and a shuttle configured to move within shuttle track between the boring apparatus and the base station, in accordance with some examples.

Referring to FIG. 2A, boring system 100 also comprises tunnel profiler 150. Tunnel profiler 150 can be a part of base station 120 and/or boring apparatus 110. In some examples, tunnel profiler 150 is a part of shuttle 130. Tunnel profiler 150 is configured to receive movement parameters 180 from shuttle 130 and determine a tunnel profile based on movement parameters 180 and, in some examples, to compare this determined tunnel profile to the desired tunnel profile. Tunnel profiler 150 can be equipped with a communication unit for communicating with shuttle 130 and receiving movement parameters 180 from shuttle 130. This communication unit can also transmit the desired boring direction to boring apparatus 110 to ensure that the actual tunnel profile corresponds to the desired one. Tunnel profiler 150 can be also equipped with memory for storing movement parameters 180 (e.g., multiple sets of movement parameters 180 can be aggregated for accuracy). Furthermore, the memory of tunnel profiler 150 can store various processing instructions for processing movement parameters 180. Finally, tunnel profiler 150 can comprise a processor for processing movement parameters 180 from shuttle 130 and determine the tunnel profile.

Figure 2B:
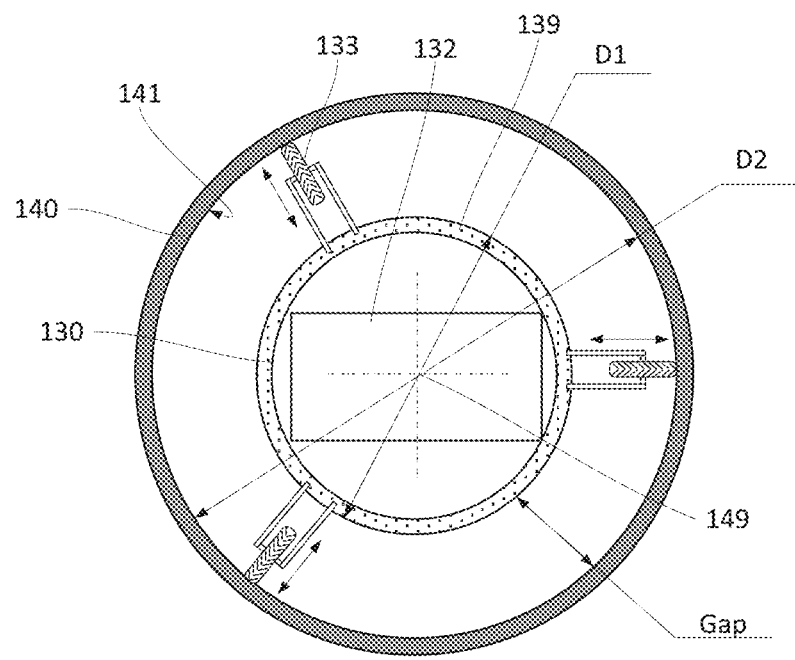
FIG. 2B is a cross-sectional view of a shuttle track illustrating a shuttle supported by multiple wheels within the shuttle track, in accordance with some examples.
Figure 2C:
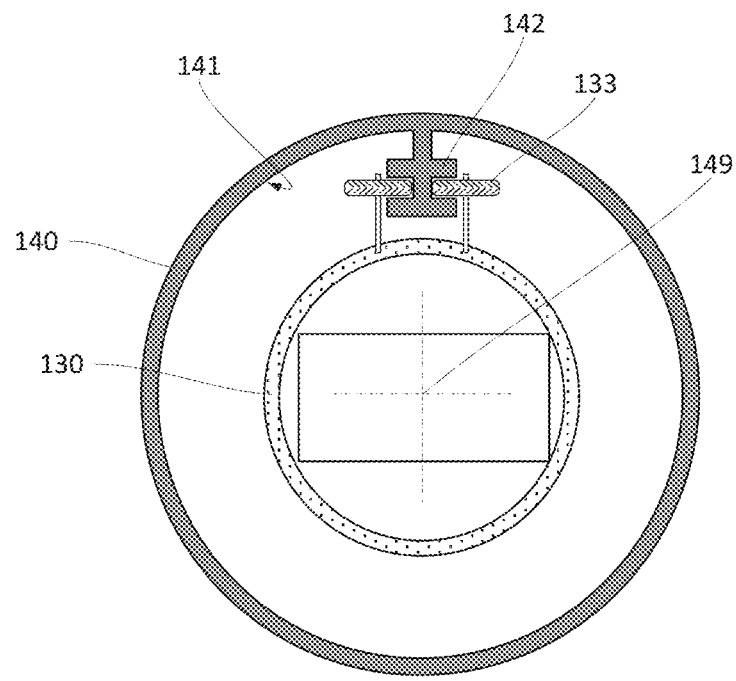
FIG. 2C is a cross-sectional view of a shuttle track illustrating a shuttle supported by the supporting structure of the shuttle track, in accordance with some examples.

Referring to FIGS. 2A, 2B, and 2C, in some examples, shuttle 130 comprises multiple support wheels 133. Support wheels 133 are configured to engage shuttle track 140, while supporting and positioning shuttle 130 relative to shuttle track 140. Support wheels 133 also allow shuttle 130 to move within shuttle track 140, e.g., along shuttle-track center axis 149 between boring apparatus 110 and base station 120.

Referring to FIG. 3A, support wheels 133 can be configured to contact and roll on interior wall 141 of shuttle track 140. Specifically, shuttle 130 comprises shuttle body 139, which encloses movement sensor 132. Support wheels 133 are connected to and extend outside shuttle body 139, uniformly surrounding shuttle body 139, and contact shuttle track 140. For example, shuttle 130 comprises a front set of three wheels arranged in a triangular pattern proximal the front of shuttle 130 and configured to locate the front of shuttle 130 in a circular bore of shuttle track 140. Shuttle 130 also comprises a second set of three wheels arranged in a triangular pattern proximal the rear of shuttle 130 and configured to locate the rear of shuttle 130 in the circular bore of shuttle track 140.

Referring to FIG. 3A, the cross-sectional size (D1) of shuttle 130 can be sufficiently smaller than the internal size (D2) of shuttle track 140. For example, the D1/D2 ratio can be less than 80%, less than 60%, or even less than 40%. This size difference allows some changes in the cross-section of shuttle track 140 while providing sufficient space for shuttle 130. For example, some cross-sectional changes are possible when shuttle track 140 bends inside tunnel 190, e.g., to follow the tunnel profile. As such, the gap between shuttle 130 and shuttle track 140 can vary.

Referring to FIG. 3A, in some examples, support wheels 133 are movably connected to shuttle body 139 allowing to charge the gap between shuttle body 139 and shuttle track 140. In other words, support wheels 133 allow shuttle 130 to move relative to interior wall 141. For example, support wheels 133 can be spring-loaded such that the spring pushes the corresponding support wheel toward shuttle track 140 thereby ensuring the contact between the wheel and shuttle track 140. The spring can compress when the cross-section of shuttle track 140 reduces.

Referring to FIG. 3B, in some examples, shuttle track 140 comprises interior wall 141 and supporting structure 142, protruding internally away from interior wall 141 (e.g., toward shuttle-track center axis 149). For example, supporting structure 142 can have an angular shape. Shuttle 130 is slidably supported by supporting structure 142. For example, shuttle 130 comprises support wheels 133, positioned on each side of supporting structure 142. The cross-sectional shape of supporting structure 142 is such that shuttle 130 maintains its position relative to interior wall 141 of shuttle track 140.

In some examples, one of support wheels 133 is encoder wheel 131, used for determining the position of shuttle 130 within shuttle track 140. The output of encoder wheel 131 can be stored by shuttle 130, e.g., using memory 138 of shuttle 130. Furthermore, movement parameters 180 can be correlated to the position of shuttle 130 within shuttle track 140 (at respective times). In some examples, this correlation is performed at shuttle 130, e.g., using shuttle controller 136. The correlated data is then transmitted to tunnel profiler 150 using communication unit 137 of shuttle 130. In some examples, shuttle 130 is operable as tunnel profiler 150 and is configured to determine the tunnel profile.

In some examples, one of support wheels 133 of shuttle 130 is drive wheel 134, e.g., used for moving and controlling the speed of shuttle 130 within shuttle track 140. For example, drive wheel 134 can comprise or be mechanically coupled to an electric motor, coupled to and powered by power unit 135 of shuttle 130. The speed, with which drive wheel 134 propels shuttle 130 within shuttle track 140, can be controlled by shuttle controller 136. In some examples, shuttle 130 travels with a constant speed between boring apparatus 110 and base station 120. It should be noted that even in these examples, the speed used for different shuttle runs can be different, e.g., shuttle 130 can travel at a higher speed during one run than in another run. Alternatively, the speed of shuttle 130 can vary during the same run. For example, the speed profile can be determined based on movement parameters 180 obtained during the previous run (e.g., shuttle 130 can go faster in less curved portions of tunnel 190 or, more specifically, in less curved portions of shuttle track 140).

For example, shuttle 130 can move at an average speed of 25 meters per second between boring apparatus 110 and base station 120 and can, thus, can traverse a 400-meter-long tunnel in one direction in approximately 16 seconds. Throughout this "scan cycle," shuttle 130 or, more specifically, movement sensor 132 can capture linear acceleration values (e.g., based on vibration), angular displacement values, and/or other like data. In some examples, linear acceleration values and angular displacement values are obtained in three degrees of freedom (along and about three axes) thereby providing six data packets per sampling period (e.g., at a rate of 400 Hz) and may be referred to as inertial data packets. For example, for traversal of the 400-meter-long tunnel in one direction, movement sensor 132 can capture 6400 inertial data packets, or 16 data packets per meter, or one data packet per 62.5 millimeters along the length of the tunnel.

Referring to FIGS. 2B and 2C, in some examples, shuttle track 140 comprises a circular interior cross-section. However, other cross-sectional shapes are also within the scope. Additional features of shuttle track 140 are described below with reference to FIGS. 5A and 5B.

Tunnel Profiling Examples

Figure 3:
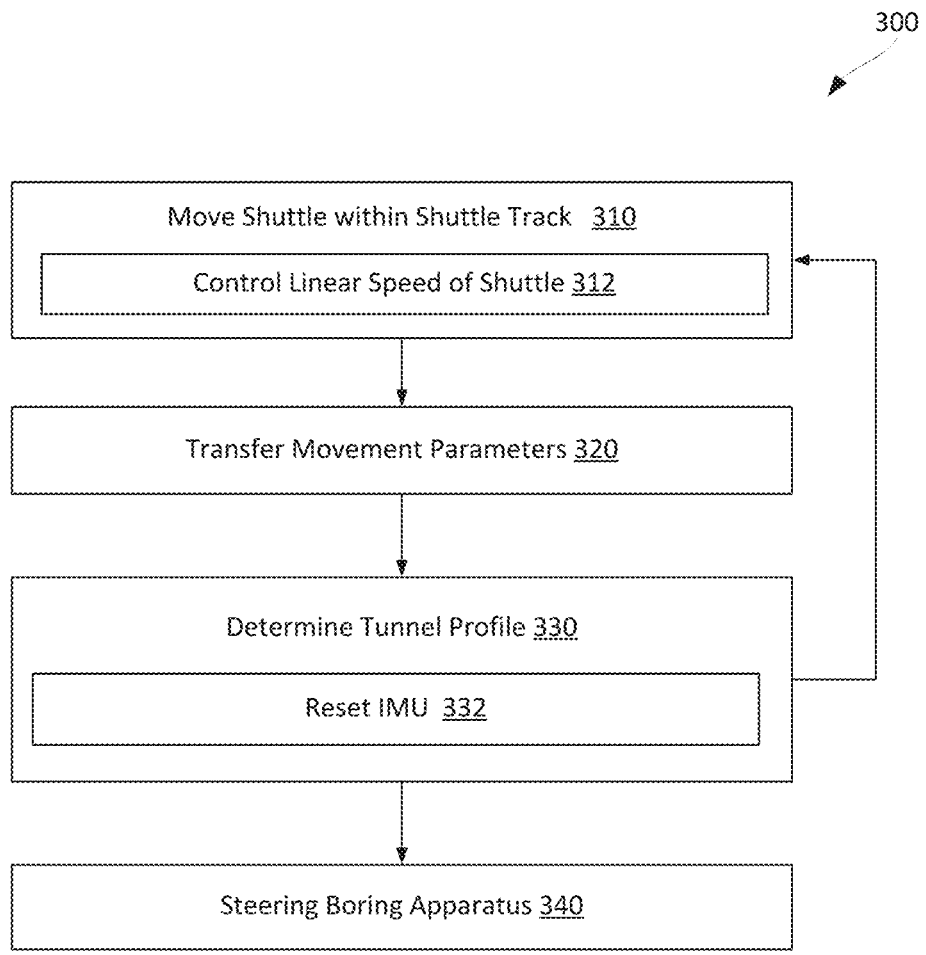
FIG. 3 is a process flowchart corresponding to a method of profiling a tunnel, in accordance with some examples.

FIG. 3 is a process flowchart corresponding to method 300 for profiling tunnel 190 in accordance with some examples. The tunnel profile is referenced to the position of base station 120. The global position of base station 120 can be determined using GPS, surveying techniques, and/or other means. The tunnel profile includes various spatial and directional components, e.g., azimuth and elevation directions of tunnel 190.

Method 300 comprises (block 310) moving shuttle 130 within shuttle track 140 extending between boring apparatus 110 and base station 120 while movement sensor 132 records movement parameters 180 of shuttle 130. For example, shuttle 130 can be equipped with drive wheel 134 that contacts shuttle track 140 and advances shuttle 130 relative to shuttle track 140. In some examples, moving shuttle 130 comprises (block 312) controlling the linear speed of shuttle 130 within shuttle track 140, e.g., by controlling the power supplied to drive wheel 134. For example, a constant speed can be used for the entire length of the shuttle's travel between boring apparatus 110 and base station 120. Alternatively, the shuttle speed can vary, e.g., the speed can be selected based on the expected curvature of shuttle track 140. Specifically, a slower speed can be chosen for the shuttle track's portions that have a higher curvature.

Figure 4A:
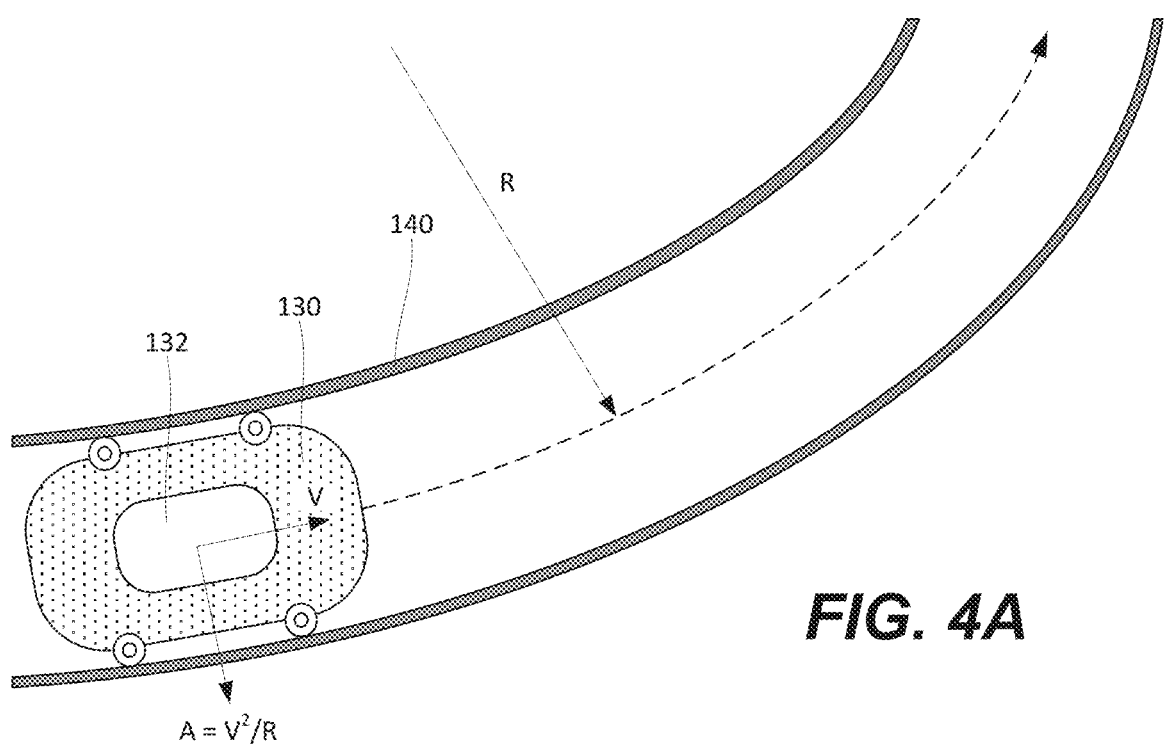
FIG. 4A is a cross-sectional schematic view of a shuttle moving inside the shuttle track, in accordance with some examples.

FIG. 4A is a schematic illustration of shuttle 130 moving through a curved portion of shuttle track 140. The linear acceleration (A), corresponding to the centrifugal force and registered by movement sensor 132 is equal to the square of the linear speed of shuttle 130 divided by the curvature radius ($A=V^2/R$). Therefore, increasing the speed of shuttle 130 can be used to significantly increase the linear acceleration, e.g., to reduce any noise effects. In some examples, moving shuttle 130 within shuttle track 140 can be repeated multiple times at different speeds. While higher speeds can be beneficial to improve the noise-to-signal ratio, the acceleration (caused by these speeds should be within the operating range of movement sensor 132). Furthermore, considering that movement sensor 132 can register linear acceleration values at a set frequency, increasing the speed reduces the number of linear acceleration values for a given portion of shuttle track 140.

Figure 4B:
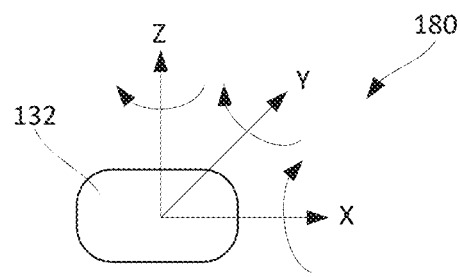
FIG. 4B is a schematic illustration of various movement parameters recorded by the movement sensor of a shuttle while the shuttle moves inside the shuttle track, in accordance with some examples.
Figure 4C:
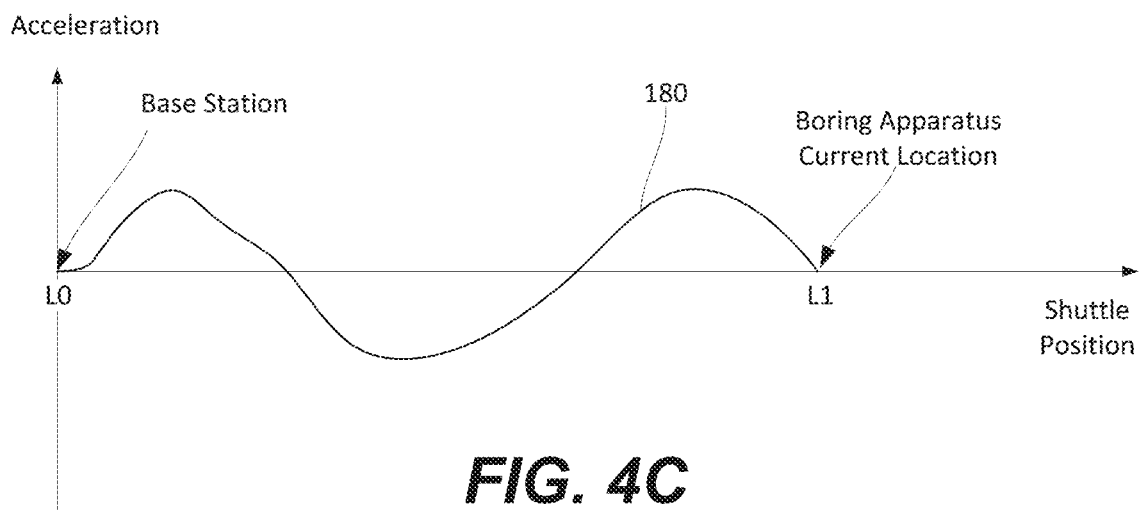
FIG. 4C is a profile of movement parameters as a function of the shuttle position in the shuttle track, in accordance with some examples.

In some examples, movement parameters 180 comprise linear acceleration values for each of one or more internal axes of movement sensor 132 as, e.g., is schematically shown in FIG. 4B. In the same or other examples, movement parameters 180 comprise angular displacement values for each of one or more internal axes of movement sensor 132. While additional types of values may be useful for more precise determination of the boring apparatus location, these additional types can increase the size, weight, and complexity of values. Furthermore, additional types of values can further complicate the tunnel profiling analysis. As noted above, in some examples, movement parameters 180 are correlated to specific positions of shuttle 130 within shuttle track 140 when each of these movement parameters 180 was obtained as, e.g., is schematically shown in FIG. 4C. Furthermore, movement parameters 180 can be correlated to other indicators, such as the roll and pitch of movement sensor 132 based on the gravitation force acting on movement sensor 132.

Figure 5A:
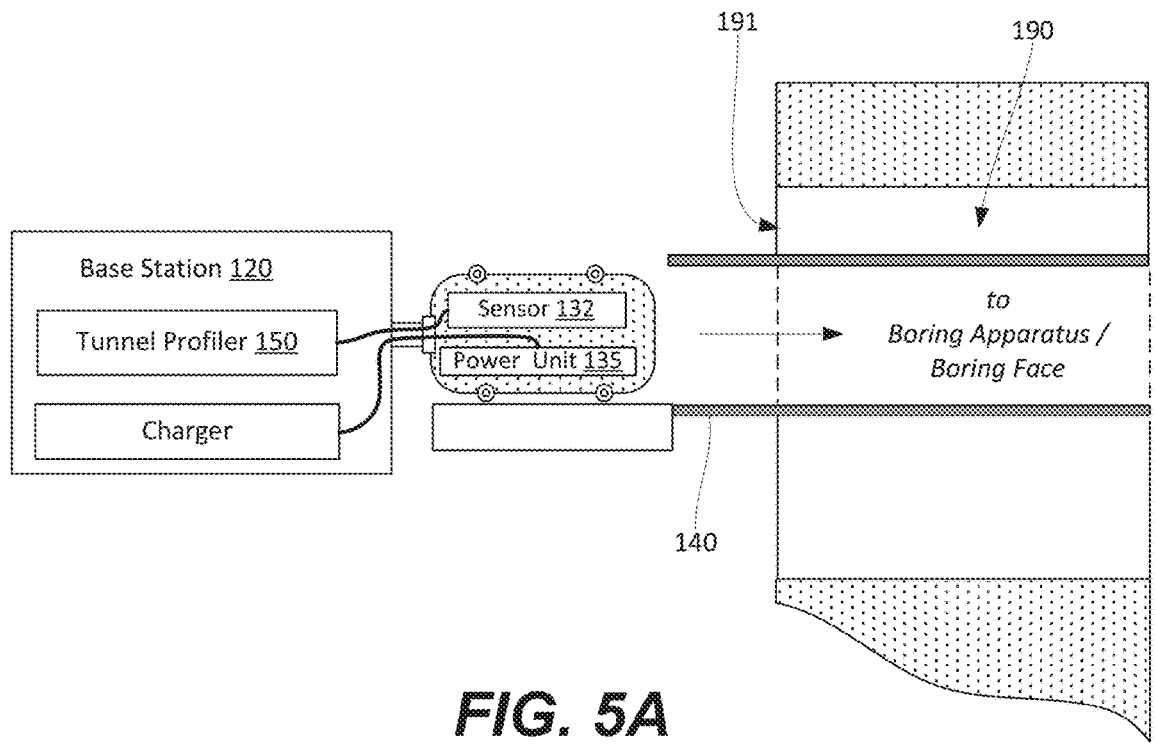
FIGS. 5A and 5B are cross-sectional schematic views of two examples of a shuttle communicative coupled to a tunnel profiler.
Figure 5B:
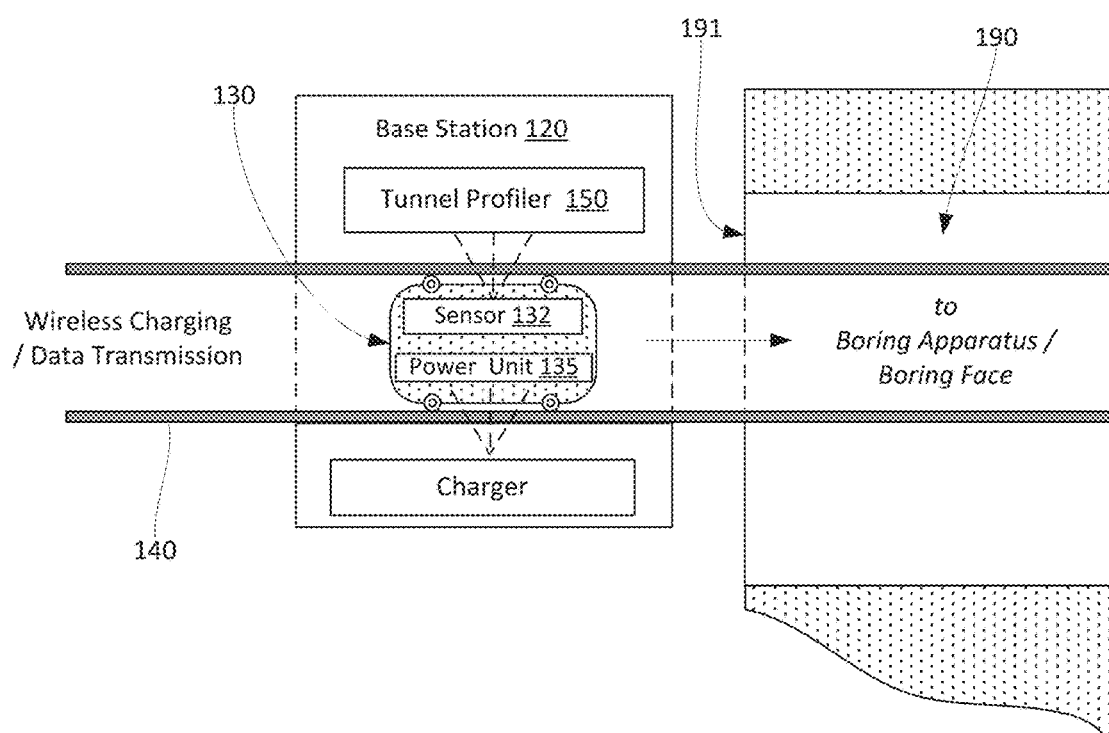

Method 300 comprises (block 320) transferring movement parameters 180 from shuttle 130 to tunnel profiler 150. Tunnel profiler 150 is then used to determine the tunnel profile based on movement parameters 180. In some examples, tunnel profiler 150 is a part of base station 120 as, e.g., is schematically shown in FIGS. 5A and 5B. For example, when shuttle 130 reaches base station 120 (after moving from boring apparatus 110), shuttle 130 stops at base station 120 to transfer movement parameters 180 to tunnel profiler 150 of base station 120. Base station 120 is positioned outside tunnel 190 and is not as space-restricted as boring apparatus 110 or shuttle 130, which are two other alternatives where tunnel profiler 150 can be placed. Furthermore, unlike boring apparatus 110, base station 120 is not subjected to heat, vibration, and other environmental conditions associated with the material removal from boring face 192 of tunnel 190. Finally, various aspects of controlling the movement of boring apparatus 110 can be performed from base station 120.

In some examples, when movement parameters 180 are transferred from shuttle 130 to tunnel profiler 150, shuttle 130 is removed from shuttle track 140, e.g., as schematically shown in FIG. 5A. For example, shuttle track 140 can extend to tunnel entrance 191 and end before reaching base station 120. Shuttle 130 exits shuttle track 140 (from the end of shuttle track 140) and communicatively couples to tunnel profiler 150 (e.g., using wired connections). This communicative coupling is used to transfer movement parameters 180. In some examples, this communicative coupling is also used to transfer various control parameters to shuttle 130 (e.g., speed parameters). In some examples, shuttle 130 also forms power coupling with base station 120. For example, base station 120 can be equipped with a charger for charging shuttle 130 or, more specifically, power unit 135 of shuttle 130.

In these examples, method 300 comprises extending shuttle track 140 as tunnel 190 is being bored and shuttle track 140 extends further into tunnel 190. For example, an additional track section may be added to each last section of shuttle track 140 thereby extending the length of shuttle track 140. In more specific examples, at least some pairs of adjacent track sections have flexible/pivotable coupling thereby allowing shuttle track 140 to extend through various turns in tunnel 190. In the same or other examples, at least some track sections are flexible/bendable.

Alternatively, movement parameters 180 are transferred from shuttle 130 to tunnel profiler 150 while shuttle 130 is positioned inside shuttle track 140, e.g., as schematically shown in FIG. 5B. In these examples, the transferring of movement parameters 180 from shuttle 130 to tunnel profiler 150 is performed wirelessly through shuttle track 140. For example, shuttle track 140 can extend through base station 120. This approach allows using longer sections of shuttle track 140 and reduces the number of couplings. In some examples, shuttle track 140 comprises a flexible continuous tube.

Referring to FIG. 5B, shuttle 130 can stop inside shuttle track 140 while being aligned with base station 120. For example, base station 120 can emit the signal which is used by shuttle 130 to determine the stopping location. Furthermore, shuttle 130 can be equipped with encoder wheel 131 to determine the position of shuttle 130 within shuttle track 140 and relative to base station 120. Finally, shuttle 130 can use movement parameters 180 to determine the position of shuttle 130 relative to base station 120. Similar to wireless transmission of movement parameters 180 (through shuttle track 140), power unit 135 of shuttle 130 can be wirelessly charged through shuttle track 140 (e.g., using the charger of base station 120).

Regardless of wireless or wired transmission of movement parameters 180, shuttle 130 can be also recharged during this operation. In some examples, shuttle 130 is not deployed from base station 120 until the SOC of power unit 135 is above a set threshold, determined by the energy requirement for shuttle 130 to travel from base station 120 to boring apparatus and back to base station 120.

Method 300 comprises (block 330) determining the profile of tunnel 190 based on movement parameters 180. Specifically, movement parameters 180 represent the shuttle path (e.g., all segments and turns traveled by shuttle 130 within shuttle track 140). For example, dead reckoning techniques can be used to compile movement parameters 180 (e.g., in the form of inertial data comprising linear acceleration values and/or angular displacement values) into one approximation of the path of shuttle 130 during the scan cycle and, thus, the as-built path of tunnel 190. In some examples, this operation involves generating an as-built tunnel path in a 3D geospatial coordinate system by snapping the as-built tunnel path to a geospatial location detected by shuttle 130 before entering tunnel 190 during this scan cycle and, e.g., by aligning the first segment of the as-built tunnel path to the compass heading detected at the tunnel entrance.

During and/or upon completion of this first segment of the scan cycle, the processor in shuttle 130 can implement dead reckoning techniques to derive a cumulative change in the 3D position and orientation of shuttle 130—relative to the start position—for each sampling period during this first scan cycle segment. For example, the processor can calculate one ($\Delta x$, $\Delta y$, $\Delta z$, $\Delta \sigma x$, $\Delta \sigma y$, $\Delta \sigma z$) position and orientation of shuttle 130—relative to the start position—for each inertial data packet captured during the first segment of the scan cycle. The processor can then: calculate a smooth spline through these ($\Delta x$, $\Delta y$, $\Delta z$, $\Delta \sigma x$, $\Delta \sigma y$, $\Delta \sigma z$)$1 \rightarrow n$ positions and orientations, thereby interpolating the first 3D as-built tunnel path of the centerline of the tunnel; snap the first point in the first as-built tunnel path to the geospatial location of the start position of the scan cycle; snap the first point in the first as-built tunnel path to the azimuth (e.g., established by two or more GPS readings) established at the start position of the scan cycle; and align a direction of gravity detected in a first data packet captured during a first sampling period—represented by the first point in the first as-built tunnel path (e.g., to measure the track angle at the base station).

Therefore, the processor in shuttle 130 can derive the first 3D as-built tunnel path from movement parameters 180 captured during the first segment of the scan cycle and locate this first 3D as-built tunnel path in an absolute geospatial coordinate system based on a geospatial position, compass heading, and direction of gravity recorded at the beginning of this scan cycle.

Similarly, shuttle 130 can capture a stream of movement sensor data as shuttle 130 moves along shuttle track 140, exits the ground penetration, and returns to the control station during a second segment of the scan cycle. Once shuttle 130 completes this second segment of the scan cycle, shuttle 130 can also record its geospatial location and compass heading at this end position.

During and/or upon completion of this second segment of the scan cycle in which shuttle 130 returns to the control station, the processor in shuttle 130 can implement dead reckoning techniques to derive a cumulative change in the 3D position and orientation of shuttle 130—relative to boring apparatus 110—for each sampling period during this second scan cycle segment. For example, the processor can calculate one ($\Delta x$, $\Delta y$, $\Delta z$, $\Delta \sigma x$, $\Delta \sigma y$, $\Delta \sigma z$) position and orientation of shuttle 130—relative to boring apparatus 110—for each inertial data packet captured during the second segment of the scan cycle. The processor can then: calculate a smooth spline through these ($\Delta x$, $\Delta y$, $\Delta z$, $\Delta \sigma x$, $\Delta \sigma y$, $\Delta \sigma z$)$1 \rightarrow n$ positions and orientations, thereby interpolating a second 3D as-built tunnel path of the centerline of the tunnel; snap the last point in the second as-built tunnel path to the geospatial location of the end position of the scan cycle; snap the last point in the second as-built tunnel path to tangent to the compass heading recorded at the end position of the scan cycle; and align a direction of gravity detected in a last data packet captured during a last sampling period—represented by the last point in the second as-built tunnel path—to a known direction of gravity at the control station. Therefore, shuttle 130 can derive the second 3D as-built tunnel path from movement parameters 180 captured during the second segment of the scan cycle and locate this second 3D as-built tunnel path in an absolute geospatial coordinate system based on a geospatial position, compass heading, and direction of gravity recorded at the end of this scan cycle.

In some examples, shuttle 130 (or the control station, a remote computer system, etc.) can also fuse the first and second as-built tunnel paths, such as by: calculating an average of these as-built tunnel paths; or calculating an average of these as-built tunnel paths and previous as-built tunnel paths, such as with the current as-built tunnel paths weighted more than the preceding as-built tunnel paths. In another example, shuttle 130 (or the control station, a remote computer system, etc.) calculates a combination of these as-built tunnel paths with the control station end of the first as-built tunnel path weighted higher than the control station end of the second as-built tunnel path and with boring apparatus 110 end of the second as-built tunnel path weighted higher than boring apparatus 110 end of the first as-built tunnel path in order to compensate for increased cumulative error in as-built tunnel path derived visual identifier dead reckoning techniques. In yet another example, shuttle 130 (or the control station, a remote computer system, etc.) characterizes a "smoothness" of the two as-built tunnel paths, stores the "smoother" of the two as-built tunnel paths, and discards the remaining as-built tunnel path. In a similar example, shuttle 130 (or the control station, a remote computer system, etc.) characterizes error between the two as-built tunnel paths and an as-built tunnel path derived during a previous scan cycle, stores the as-built tunnel path that exhibits less error relative to the preceding as-built tunnel path, and discards the remaining as-built tunnel path. However, shuttle 130 (or the control station, a remote computer system, etc.) can fuse the first and second as-built tunnel paths in any other way. Shuttle 130 (or the control station, a remote computer system, etc.) can then store the resulting "composite" as-built tunnel path and/or return this composite as-built tunnel path to the operator panel and/or to boring apparatus 110.

Furthermore, for shuttle track 140 that extends along a length of boring apparatus 110, shuttle 130 (or boring apparatus 110, the control station, etc.) can also derive an absolute orientation of boring apparatus 110 (e.g., a direction of the longitudinal axis of boring apparatus 110) within the geospatial coordinate system from the last segment (e.g., the last meter) of the first as-built tunnel path and/or from the first segment (e.g., the first meter) of the second as-built tunnel path.

When data from encoder wheel 131 is available, shuttle 130 can detect these encoder features while traversing shuttle track 140 during the first scan cycle segment; project encoder reference points, which were detected along shuttle track 140 into the first as-built tunnel path based on times that these encoder features were detected during the first scan cycle segment; calculate the length of each segment of the first as-built tunnel path between two consecutive encoder reference points; and verify that the length of each as-built tunnel path segment equals the known distance between the encoder features on shuttle track 140. Shuttle 130 can then adjust (e.g., locally stretch or compress) the first as-built tunnel path to achieve the known distance between each pair of consecutive encoder features projected onto the first as-built tunnel path. As such, shuttle 130 can implement these encoder data as ground truth distances along shuttle track 140 to correct a cumulative error in the first as-built tunnel path derived from movement parameters 180 captured during the first scan cycle segment.

Alternatively, shuttle 130 can: discard or flag the first as-built tunnel path if the length of an as-built tunnel path segment deviates from the known distance between the encoder features on shuttle track 140 by more than a threshold distance; or characterize error along the first as-built tunnel path based on differences between the length of each as-built tunnel path segment and the known distance between the encoder features on shuttle track 140. Shuttle 130 can implement similar methods and techniques to correct, characterize, or selectively discard the second as-built tunnel path derived from movement parameters 180 captured during the first scan cycle segment.

In a similar variation, shuttle 130 can power an internal motor to actuate an integrated wheel and thus drive shuttle 130 along shuttle track 140, such as described above. Alternatively, shuttle 130 can include a freewheel in contact with shuttle track 140. During a scan cycle, shuttle 130 can thus: track a linear distance traversed by shuttle 130 based on a number of rotations of the driven wheel or freewheel; and then implement these odometry data as ground truth distances along shuttle track 140 to correct cumulative distance errors in the first and second as-built tunnel paths thus derived from movement parameters 180 captured during the first and second scan cycle segment.

Therefore, shuttle 130 (or the control station, a remote computer system, etc.) can implement dead reckoning and ground truth odometry techniques to transform movement parameters 180—captured during a sequence of sampling periods as shuttle 130 moves between the control station and boring apparatus 110—into a 3D as-built tunnel path (e.g., a 3D path approximating a centerline of the tunnel) within a 3D geospatial coordinate system.

In some examples, method 300 comprises (block 332) resetting movement sensor 132 after transferring movement parameters 180 and before moving shuttle 130 within shuttle track 140 each one or one or more additional times. Specifically, movement sensor 132 is reset for any bias and drifts, accumulated during one or more previous scan cycles. The signal-to-noise ratio is improved as a result of this reset operation since the bias and drifts are not integrated across multiple scan cycles. Furthermore, the signal-to-noise ratio is improved due to higher acceleration rates.

In some examples, determining the profile of tunnel 190 further comprises determining the global position of tunnel 190 (e.g., to reference the actual tunnel profile relative to the desired tunnel profile). This global position of tunnel 190 can be determined based on the orientation of tunnel 190 relative to base station 120 (e.g., determined from movement parameters 180). For example, the direction of the tunnel portion adjacent to the tunnel entrance can be used for this purpose. This global position of tunnel 190 can be further determined based on the global position of base station 180 (e.g., using GPS, surveying, and other techniques).

Referring to FIG. 3, in some examples, method 300 further comprises repeating the operations represented by block 310, block 320, and block 330 at least one more time. For example, method 300 comprises moving shuttle 130 within shuttle track 140 extending between boring apparatus 110 and base station 120 one or more additional times while movement sensor 132 records one or more additional sets of movement parameters 181. In this example, the tunnel profile is further determined using one or more additional sets of movement parameters 181. Overall, shuttle 130 can continue moving between boring apparatus 110 and base station 120 at any time when power unit 135 has sufficient power to complete this operation. Additional sets of movement parameters 181 help to improve the precision of determining the tunnel profiling. For example, shuttle 130 can continue to cycle between boring apparatus 110 and base station 120 while boring apparatus 110 continues to extend tunnel 190.

For example, this sequence of operations can be repeated continuously or once per set period (e.g., every minute) through the entire boring operation and, thus, regularly update the estimated as-built tunnel path as boring apparatus 110 extends tunnel 190. By resetting shuttle 130 and regularly executing such scan cycles throughout the boring operation, shuttle 130 can also validate past as-built tunnel paths estimated from movement parameters 180 captured during previous scan cycles—rather than accumulating as-built tunnel path error over time.

In some examples, boring system 100 can compare each successive as-built tunnel path to the 3D planned route of the tunnel, detecting differences between them and adjusting its boring parameters in real-time to reduce these differences. For example, boring apparatus 110 can steer boring element 112 (which may be also referred to as a boring head) in the direction of detected differences and selectively dwell, increase raster density, and/or slow a raster speed of boring element 112 in the direction of such detected differences to preferentially increase material removal from bore face 192 in the direction(s) of detected differences between a current as-built tunnel path and the 3D planned route of tunnel 190.

In some examples, method 300 further comprises (block 340) steering boring apparatus 110 within tunnel 190 based on the tunnel profiled, determined previously. For example, base station 120 can then return composite as-built tunnel paths to an operator panel (e.g., a virtual operator portal accessible to the boring crew via a laptop computer, a tablet, a smartphone, or other computing devices), thereby enabling boring operator via the absolute position of boring apparatus 110 and the as-built path of the tunnel (such as next to the planned route of the tunnel) within a geospatial coordinate system.

Furthermore, base station 120 can transmit as-built tunnel path to boring apparatus 110 via the data line. Therefore, boring apparatus 110 can gain immediate access to the as-built tunnel path once shuttle 130 reaches boring apparatus 110 and can take immediate action to recover from a difference between this as-built tunnel path and the planned route.

Tunnel Planning Examples

In some examples, boring system 100 accesses a 3D tunnel route representing a target (or "nominal") centerline of the tunnel within the geospatial coordinate system. For example, boring system 100 can download the planned 3D tunnel route in the form of a spline defined within the geospatial coordinate system. In other examples, boring system 100 receives a sequence of underground 3D waypoints defined within the geospatial coordinate system and calculates linear route sections between these waypoints. In this example, boring system 100 then "fillets" the vertices between consecutive linear route sections, such as: by a fixed nominal bend radius (e.g., 100 meters); by a standard radius specified for a type and size of service that the tunnel is designated to carry (e.g., 25-meter radius for 400-Volt, 3-phase, 500-Amp electrical line; the 50-meter rate for 2" potable water line; 100-meter radius for 12" potable waterline); or by a radius proportional to an angle between the adjacent linear sections, such as a 10-meter radius for a 1° angle, a 20-meter radius for a 10° angle, a 50-meter radius for a 30° angle, a 100-meter radius for a 90° angle. Boring system 100 then snaps each fillet between two linear route sections to its nearest waypoint, compiles these fillets and linear route sections into a contiguous line (or "spline"), and stores this contiguous line as a planned georeferenced tunnel route.

In some examples, boring apparatus 110 can: load the planned 3D tunnel route and the current as-built tunnel path into a 3D virtual space; calculate the shortest vector between the distal end of the as-built tunnel path—which represents the current geospatial location of boring apparatus 110—and the planned 3D tunnel route; and implement closed-loop controls to steer boring apparatus 110 in the direction of this vector, such as by preferentially rastering the boring head in the direction of this vector—proportional to the length of this vector—to maintain a minimum offset between the planned 3D tunnel route and the as-built tunnel path over the entire length of the tunnel.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer-readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

What is claimed is:

1. A method of profiling a tunnel, the method comprising:
   moving a shuttle, comprising a movement sensor, within a shuttle track extending along the tunnel,
      wherein the shuttle is moved between and relative to each of a boring apparatus and a base station while the movement sensor records movement parameters of the shuttle representing and associated with moving the shuttle within the shuttle track, and
      wherein the shuttle is moved with a speed that is at least 100 times higher than a speed of the boring apparatus,
   transferring the movement parameters, recorded by the movement sensor while the shuttle moves within the shuttle track, from the shuttle to a tunnel profiler; and
   determining, at the tunnel profiler, a profile of the tunnel, relative to the base station, based on the movement parameters,
      wherein the movement parameters comprise linear acceleration values for each of one or more internal axes of the movement sensor, and
      wherein determining the profile of the tunnel comprises correlating the movement parameters to specific positions of the shuttle within the shuttle track when each of the movement parameters was obtained.

2. The method of claim 1, wherein the tunnel profiler is a part of the base station.

3. The method of claim 2, wherein the transferring the movement parameters from the shuttle to the tunnel profiler is performed wirelessly through the shuttle track, extending through the base station.

4. The method of claim 1, wherein the transferring the movement parameters from the shuttle to the tunnel profiler is performed while recharging the shuttle.

5. The method of claim 1, wherein the shuttle comprises a drive wheel, moving and controlling the speed of the shuttle within the shuttle track.

6. The method of claim 1, wherein:
the shuttle comprises an encoder wheel determining the specific positions of the shuttle along the shuttle track, and
the movement parameters are correlated to corresponding ones of the specific positions of the shuttle within the shuttle track while determining the profile of the tunnel.

7. The method of claim 1, wherein:
the shuttle comprises a shuttle body and multiple support wheels,
the shuttle body encloses the movement sensor, and
the multiple support wheels are connected to and extend outside the shuttle body, uniformly surrounding the shuttle body, and contact the shuttle track thereby supporting the shuttle relative to the shuttle track.

8. The method of claim 7, wherein the multiple support wheels are movably connected to the shuttle body allowing to change a gap between the shuttle body and the shuttle track.

9. The method of claim 1, wherein the shuttle track comprises a flexible continuous tube.

10. The method of claim 1, wherein the shuttle track comprises multiple segments joined together.

11. The method of claim 1, wherein the shuttle track comprises a circular interior cross-section.

12. The method of claim 1, wherein:
the shuttle track comprises an interior wall and a supporting structure, protruding internally away from the interior wall, and
the shuttle is slidably supported by the supporting structure.

13. The method of claim 1, wherein the movement parameters comprise angular displacement values for each of one or more internal axes of the movement sensor.

14. The method of claim 1, wherein the moving the shuttle comprises controlling a linear component of the speed of the shuttle within the shuttle track.

15. The method of claim 1, further comprising moving the shuttle within the shuttle track extending between the boring apparatus and the base station one or more additional times while the movement sensor records one or more additional sets of movement parameters, wherein the profile of the tunnel is further determined using the one or more additional sets of movement parameters.

16. The method of claim 15, further comprising resetting the movement sensor after transferring the movement parameters and before moving the shuttle within the shuttle track each one of the one or more additional times.

17. The method of claim 1, wherein the determining the profile of the tunnel further comprises determining a global position of the tunnel based on a orientation of the tunnel relative to the base station and further based on the global position of the base station.

18. The method of claim 1, further comprising steering the boring apparatus within the tunnel based on the profile of the tunnel determined at one or more different times.

19. The method of claim 1, wherein the speed with which the shuttle moves along the shuttle track is constant.

20. A boring system comprising:
a boring apparatus configured to bore a tunnel;
a base station configured to supply power and operating instructions to the boring apparatus while the boring apparatus bores the tunnel;
a shuttle track configured to extend along the tunnel between the boring apparatus and the base station while the boring apparatus bores the tunnel;
a shuttle comprising a movement sensor and configured to move within the shuttle track between and relative to each of the boring apparatus and the base station with a speed that is at least 100 times higher than a speed of the boring apparatus while the movement sensor records movement parameters of the shuttle, wherein the movement parameters comprise linear acceleration values for each of one or more internal axes of the movement sensor; and
a tunnel profiler configured to receive the movement parameters from the shuttle and determine a profile of the tunnel based on the movement parameters by correlating the movement parameters to specific positions of the shuttle within the shuttle track when each of the movement parameters was obtained.

* * * * *